United States Patent Office 2,998,122
Patented Aug. 29, 1961

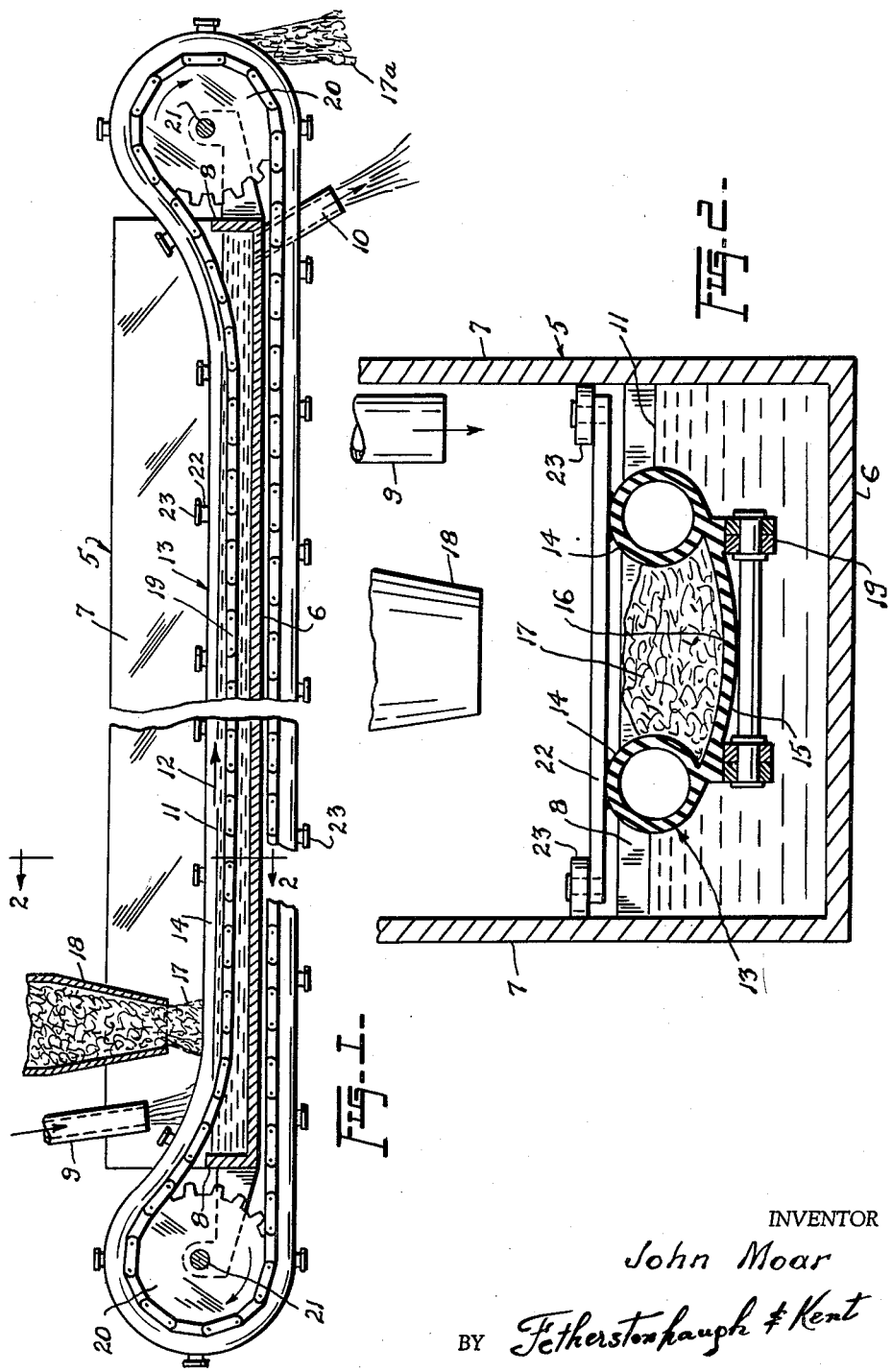

2,998,122
FLOATING CONVEYOR BELT
John Moar, 11632 Edinboro Road, Edmonton,
Alberta, Canada
Filed Nov. 5, 1956, Ser. No. 620,555
1 Claim. (Cl. 198—201)

My invention relates to new and useful improvements in the art of conveying materials and the like, the principal object and essence of my invention being to provide a conveyor belt which includes flotation means so that the upper run of the belt is supported upon a flotation medium.

A further object of my invention is to provide a device of the character herewithin described in which the flotation medium can either be carried in a conduit or within a trough canal or the like.

Yet another object of my invention is to provide a device of the character herewithin described in which the conveyor belt can be of the endless variety or, alternatively, can be deflated and returned to the commencement of the conduit or trough after use for repeat transportation usage.

A yet further object of my invention is to provide a device of the character herewithin described in which the conveyor belt can be moved along the flotation medium by conventional means such as an external source of power or, alternatively, the flotation carrying conduit can be sloped so that the flotation medium flows by gravity carrying along the conveyor belt by skin friction.

With the foregoing objects in view, and such other objects and advantages as will become apparent to those skilled in the art to which this invention relates as this specification proceeds, my invention consists essentially in the arrangement and construtcion of parts all as hereinafter more particularly described, reference being had to the accompanying drawings in which:

FIGURE 1 is a longitudinal vertical sectional view of a conduit and conveyor belt shown in elevation; and FIGURE 2 is an enlarged cross-sectional view, taken substantially in the plane of the line 2—2 in FIGURE 1.

In the drawings like characters of reference indicate corresponding parts in the different figures.

Relatively long conveyor belts suffer from the principal disadvantage that they have to be supported constantly along their lengths by means of pulleys, rollers and the like which, if the conveyor belt is passing over rough terrain, necessitates considerable superstructure to carry these rollers and pulleys. Furthermore, when using a conveyor belt of this nature over a relatively long distance, and particularly when it is used for conveying loose material such as gravel, rock and the like, enclosing sides are required to maintain the gravel, rock or other material within the confines of the conveyor belt.

I overcome these disadvantages by providing a conveyor belt which in its formation forms a trough for receiving the material and which furthermore does not need intermediate rollers or pulleys to support same inasmuch as it is adapted to float upon the surface of a flotation medium such as water or the like.

Referring now to the accompanying drawings in detail, the numeral 5 designates an elongated conduit or trough including a bottom 6, a pair of side walls 7 and a pair of relatively low end walls 8. Suitable flotation medium such as water is discharged into one end of the conduit, as for example, through a pipe 9, and is discharged from the relatively opposite end of the conduit, as for example, through a pipe 10. The rate of flow of the water through the pipes 9 and 10 is such as to maintain a normal water level in the conduit as indicated at 11, it being understood that the water is constantly flowing in the conduit from the pipe 9 toward the pipe 10, as indicated by the arrow 12.

The conveyor belt designated generally by the numeral 13 is in the form of an endless, buoyant belt including a pair of transversely spaced, parallel, hollow and gas-filled longitudinal members or tubes 14 and a substantially flat base member 15 which has its longitudinal edges connected to lower portions of the members 14, as is clearly shown in FIGURE 2. The members 14 and 15 coact to form a trough 16 in the upper run of the belt, into which trough material 17 to be conveyed is discharged from a hopper 18 located adjacent the pipe 9. The belt members 14, 15 are attached to and supported by an endless chain assembly 19 passing over sprockets 20 mounted on suitable shafts 21 adjacent the ends and exteriorly of the conduit 5, it being noted that while the upper run of the conveyor belt passes through the conduit and floats on the water in the latter, the lower run of the belt passes under the bottom of the conduit, as shown.

The buoyancy of the conveyor belt is such that its upper run floats on the water in the conduit while supporting the material 17 conveyed thereby, and the flow of water tnrough the conduit in the direction of the arrow 12 causes the upper run of the conveyor belt to be propelled in the same direction, so that the conveyed material is ultimately discharged from the belt as indicated at 17a.

Means are provided for maintaining the conveyor belt in spaced relation from the side walls 7 of the conduit, these means comprising a set of cross bars 22 which are suitably secured at longituidnally spaced points to the belt members 14. Rollers 23 are rotatably mounted at the ends of the cross bars 22 and engage the side walls 7, whereby the belt is centralized in the conduit as illustrated in FIGURE 2.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In a floating conveyor, the combination of a liquid containing conduit, a buoyant belt floating on the liquid in said conduit, said belt including a pair of transversely spaced parallel hollow and gas-filled longitudinal members and a substantially flat base member having longitudinal edges thereof connected to the underside of said longitudinal members whereby to provide a trough for material to be conveyed, and means for maintaining said belt spaced from the walls of said conduit, said means comprising a set of cross bars extending transversely of and secured at longitudinally spaced points to said belt, and rollers rotatably mounted at the ends of said cross bars and engaging the walls of said conduit.

References Cited in the file of this patent

UNITED STATES PATENTS

| | | |
|---|---|---|
| 513,216 | Summerhayes | Jan. 23, 1894 |
| 632,750 | Ridgway | Sept. 12, 1899 |
| 697,317 | Brian | Apr. 8, 1902 |

FOREIGN PATENTS

| | | |
|---|---|---|
| 10,914 | Great Britain | May 7, 1903 |
| 115,733 | Austria | Jan. 10, 1930 |
| 919,226 | France | Nov. 18, 1946 |